Sept. 6, 1927.
C. MAHLOY
LETTER SCALE
Filed Oct. 18, 1926
1,641,596
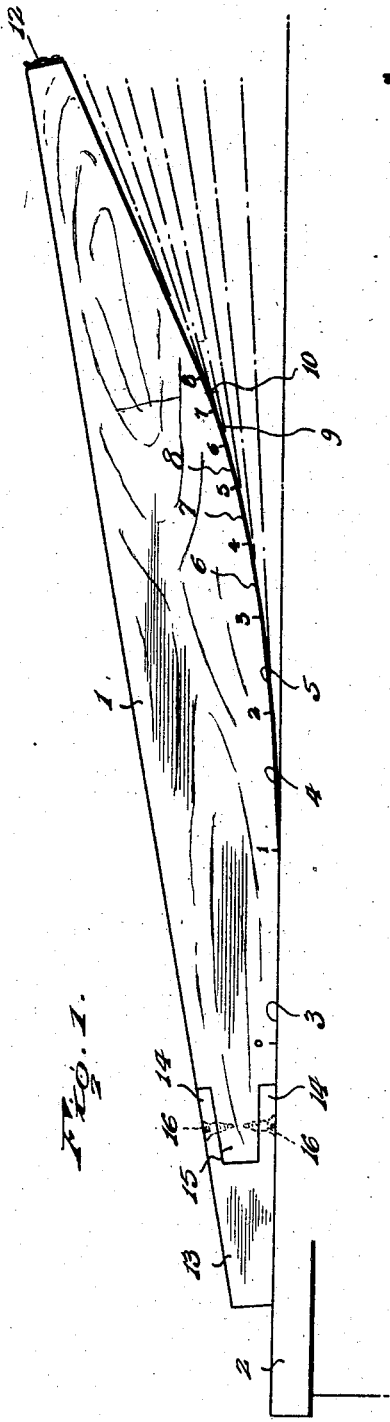
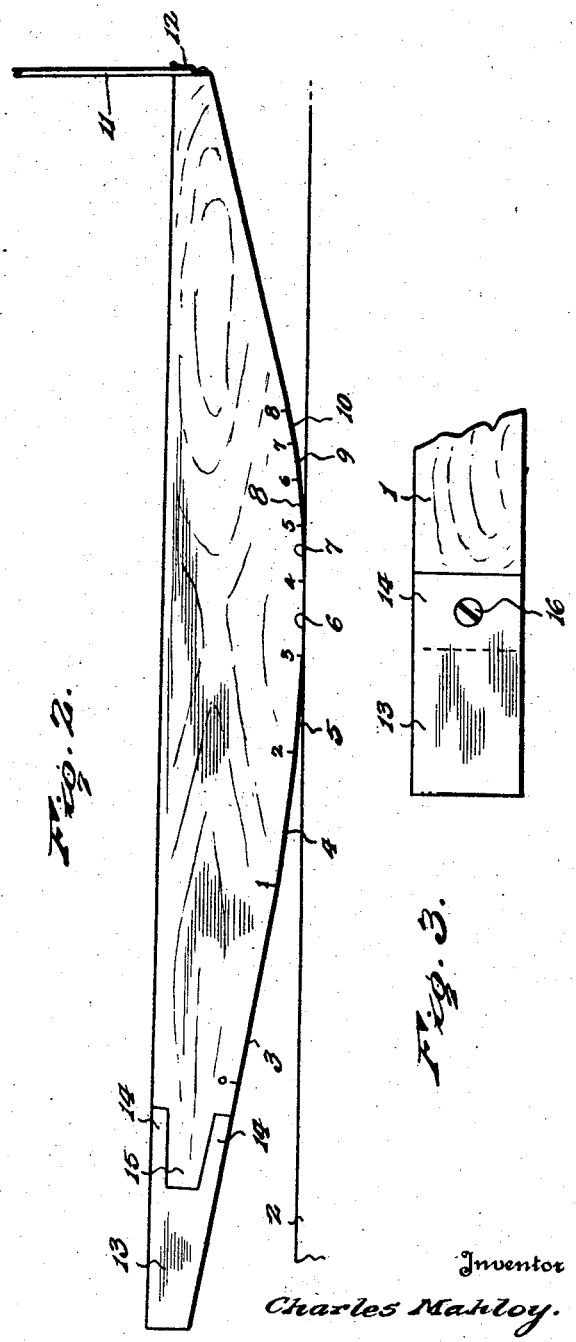
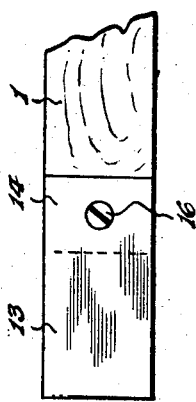
Inventor
Charles Mahloy.
By Lacey & Lacey, Attorneys Patented Sept. 6, 1927.

1,641,596

UNITED STATES PATENT OFFICE.

CHARLES MAHLOY, OF ROANOKE, VIRGINIA.

LETTER SCALE.

Application filed October 18, 1926. Serial No. 142,379.

This invention relates to scales and more particularly to a scale by means of which the amount of postage required in order to send a letter through the mail may be readily ascertained.

One object of the invention is to provide a scale which will be very simple in its construction and can not get out of order.

Another object of the invention is to provide a scale consisting of a single bar adapted to rest upon a desk or table top and having its under surface so formed that the amount of postage required upon a letter engaged with one end of the bar may be indicated by the position in which the bar rests.

The invention is illustrated in the accompanying drawing, wherein

Figure 1 is a view in side elevation showing the scale in its normal position;

Fig. 2 is a side elevation showing the bar moved out of its normal position by the weight of a letter engaged therewith; and Fig. 3 is a top plan view of the weighted end of the scale forming bar.

The scale constituting the subject-matter of this invention consists of a bar 1 which is preferably wood but may be formed of metal, glass or any other desired material. The bar is of sufficient width to permit it to be supported upon its under surface when placed upon a desk or table top 2 and is preferably formed with a flat upper surface. Its under surface is substantially an irregular curve from one end to the other but is divided into a plurality of longitudinally extending flat faces 3, 4, 5, 6, 7, 8, 9 and 10 which progressively decrease in length from one end of the body towards the other end thereof and at their intersection with each other form obtuse angles. A side face of the bar is marked adjacent each of the flat under faces to indicate the weight of a letter when the scale is in use. By comparing Figs. 1 and 2, it will be readily seen that, if the bar is resting in its normal position upon the face 3 and a letter 11 engaged with the clip 12 is not of sufficient weight to move the bar off the face 3, the letter does not weigh more than one ounce and two cents postage is required, whereas if the letter causes the bar to rock to the position shown in Fig. 2 and rest upon the face 6 it weighs four ounces and eight cents postage is necessary. It will be obvious that the bar may be of greater or less length and the number of under faces varied according to the length of the bar and weight of the material from which it is made. A counterweight 13 formed of metal or other relatively heavy material is secured to the other end of the bar from the clip 12 and is preferably formed with arms 14 which overlap the reduced end portion 15 of the bar and are firmly secured thereto by screws 16. The weight serves to normally retain the bar in the position shown in Fig. 1.

When the scale is in use, it is placed upon a table top and normally assumes the position shown in Fig. 1 in which position it is supported upon the under face 3. The letter to be weighed is engaged between the clip 12 and the end of the bar to which the clip is attached and if it does not weigh more than one ounce its weight will not be sufficient to move the bar off the face 3. A letter of greater weight will cause the bar to rock longitudinally off the face 3 and rest upon a face marked to indicate additional postage. It will be obvious that instead of providing the bar with weight markings it could be marked to indicate the amount of postage due.

Having thus described the invention, I claim:

1. A scale comprising a body having a substantially arcuate under surface divided into a plurality of longitudinally extending faces, the body having one end weighted and normally resting upon a face of its under surface adjacent the weighted end of the body, and means at the opposite end of the body to support an article to be weighed whereby the body will be rocked longitudinally from one face onto another according to the weight of the article.

2. A scale comprising a body having a bowed under surface divided into a plurality of longitudinally extending flat faces progressively decreasing in length from one end of the body, towards the other, a weight carried by one end of said body and serving to normally retain the body resting upon a face adjacent the said weighted end portion of the body, and a clip secured to the opposite end of the body to support an article to be weighed whereby the body will be rocked from one face onto another according to the weight of the article.

3. A scale comprising an elongated body having a longitudinally convex under surface formed with flat faces progressively decreasing in length from one end towards the other, means being provided adjacent the last-mentioned end of the body for carrying the article to be weighed, the other end of the body being reduced from opposed faces to form a tongue extension, a weight extending longitudinally of the body and having one end formed with arms engaging the faces of said tongue and secured thereto.

In testimony whereof I affix my signature.

CHARLES MAHLOY. [L. S.]